(12) United States Patent
Battlogg (10) Patent No.: US 10,927,919 B2
(45) Date of Patent: Feb. 23, 2021

(54) ROTARY DAMPER

(71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 197 days.

(21) Appl. No.: 15/767,153

(22) PCT Filed: Oct. 16, 2016

(86) PCT No.: PCT/EP2016/074823
§ 371 (c)(1),
(2) Date: May 7, 2018

(87) PCT Pub. No.: WO2017/064315
PCT Pub. Date: Apr. 20, 2017

(65) Prior Publication Data
US 2018/0298976 A1     Oct. 18, 2018

(30) Foreign Application Priority Data
Oct. 15, 2015  (DE) .................. 10 2015 117 594

(51) Int. Cl.
*F16D 57/06*   (2006.01)
*F16F 9/53*    (2006.01)
*F16F 9/12*    (2006.01)

(52) U.S. Cl.
CPC ............. *F16F 9/535* (2013.01); *F16F 9/12* (2013.01)

(58) Field of Classification Search
CPC ... F16F 9/535; F04C 2/102; A61F 2002/5004; F16D 57/06
(Continued)

(56) References Cited

U.S. PATENT DOCUMENTS 4,844,220 A * 7/1989 Maji .................. F16D 37/02
                                              188/267
6,352,143 B1 * 3/2002 Niaura ............... F16F 9/532
                                              188/267.1
(Continued)

FOREIGN PATENT DOCUMENTS

DE       10320253 A1   11/2004
DE   102005021945 B3    2/2007
(Continued)

*Primary Examiner* — Nicholas J Lane
(74) *Attorney, Agent, or Firm* — Laurence A. Greenberg; Werner H. Sterner; Ralph E. Locher (57) ABSTRACT

A rotary damper has a displacer device with a damper shaft and displacer components engaging into one another. A rotational movement of the damper shaft can be damped. The displacer device contains a magnetorheological fluid as a working fluid. A magnetic field of a magnetic field source having an electric coil can be controlled by way of an associated control device. An end-side axial gap is formed between the housing and the displacer device. An essential part of the magnetic field of the magnetic field source passes through the axial gap between the housing and the displacer components. The magnetorheological fluid is subjected to the magnetic field in order to adjust a damping of the rotational movement of the damper shaft. The magnetic field also effects a seal of the end-side axial gap.

19 Claims, 5 Drawing Sheets

(58) Field of Classification Search
USPC .......................................................... 188/292
See application file for complete search history.

(56) References Cited

U.S. PATENT DOCUMENTS

| | | | |
|---|---|---|---|
| 9,091,309 B2 | 7/2015 | Battlogg | |
| 2003/0079948 A1* | 5/2003 | Jolly | B62D 5/005 188/267 |
| 2004/0217568 A1 | 11/2004 | Gradu | |
| 2006/0016657 A1 | 1/2006 | Gradu | |
| 2009/0183959 A1* | 7/2009 | Klit | F16F 9/53 188/267.1 |
| 2013/0103259 A1* | 4/2013 | Eng | B60G 17/019 701/37 |
| 2013/0175132 A1 | 7/2013 | Battlogg | |
| 2014/0152066 A1 | 6/2014 | Hiemenz et al. | |
| 2015/0129379 A1* | 5/2015 | Pierini | F16F 9/145 188/267.2 |
| 2016/0009158 A1* | 1/2016 | Baasch | F16F 15/0235 188/267.1 |
| 2016/0311416 A1* | 10/2016 | Bretzigheimer | B60T 8/246 |
| 2018/0215342 A1* | 8/2018 | Battlogg | F16F 9/145 |
| 2019/0111300 A1* | 4/2019 | Battlogg | A63B 24/0087 |
| 2019/0346008 A1* | 11/2019 | Battlogg | F16F 9/535 |

FOREIGN PATENT DOCUMENTS

| | | |
|---|---|---|
| DE | 102009030995 A1 | 1/2011 |
| DE | 102010055833 A1 | 3/2012 |
| DE | 102013203331 A1 | 8/2014 |
| DE | 102013014158 A1 | 9/2014 |
| JP | 2009287639 A | 12/2009 |

* cited by examiner

ROTARY DAMPER

BACKGROUND OF THE INVENTION

Field of the Invention

The present invention concerns a rotary damper, wherein the rotary damper has at least one displacer device with a damper shaft and with mutually engaging and rotating displacer components in order to damp a rotary movement of the damper shaft.

In the prior art, various rotary dampers or rotation dampers or rotation brakes are known, with which it is possible to damp the rotary movement of a damper shaft. The known rotary dampers are however often not versatile, or the braking moment required is too small, the rotation speed too high, or the braking moment cannot be changed or set, or not sufficiently quickly.

DE 10 2013 203 331 A1 discloses a rotary damper for a vehicle for damping relative movements between vehicle wheels and vehicle superstructures. A gear stage is provided with several gearwheels in active connection. The rotary movement of the gearwheels may displace hydraulic medium for hydraulic damping. The hydraulic medium may be short-circuited through an approximately sealed housing without inflow and outflow. The choking effect results from leakage.

DE 10 2013 203 331 A1 also discloses the use of a magnetorheological fluid for damping. The gear stage with the plurality of actively connected gearwheels is filled with the magnetorheological fluid. The outflow from the gear stage is conducted to an external valve, where a magnetic field acts on a magnetorheological fluid before the fluid is returned to the inlet of the housing. The disadvantage is that the housing with the gear stage is filled with the magnetorheological fluid. A magnetorheological fluid is a suspension of magnetically polarizable particles (carbonyl iron powder) which are finely distributed in a carrier fluid and have a diameter between approximately 1 μm and 10 μm. Therefore all gaps between components moving relative to each other (e.g. axial gaps between the rotating gearwheel and the housing; radial gaps between the gear flanks and the housing inner bore; gaps between intermeshing/mutually touching tooth profiles) in the gear stage must be larger than the largest magnetic particle, or even many times larger, because the particles can also agglomerate into large clumps even without a magnetic field, or form chains under the effect of the magnetic field and hence form larger carbonyl iron units. An incorrectly selected gap leads to seizing/jamming, or the (coated) particles are crushed and hence unusable. This however has the significant disadvantage that, because of this absolutely necessary air gap/running play, a very high leakage current occurs, particularly if we recall that pressures of over 100 bar are to be obtained. Thus high damping values cannot be achieved. To achieve high damping values, all gaps must be sealed in a complex fashion, which is costly or in some cases technically impossible (e.g. rolling gap between two involute tooth profiles). The end-side seal, tight against high pressures, of a complexly formed gearwheel in combination with iron-containing fluids, cannot realistically be achieved economically in large series production. Therefore the construction principle from DE 10 2013 203 331 A1 in combination with magnetorheological fluids is not suitable for production of economic, versatile rotary dampers for damping high forces or moments.

BRIEF SUMMARY OF THE INVENTION

It is therefore the object of the present invention to provide an economic rotary damper which allows flexible setting of the damping of the damper shaft and the damping of high forces and torques, and which in particular is simple in construction.

This object is achieved by a rotary damper with the features as claimed. Preferred refinements of the invention are the subject of the dependent claims. Further advantages and features of the present invention arise from the general description and the description of the exemplary embodiment.

A rotary damper according to the invention has a housing and at least one displacer device arranged therein or thereon, and at least one magnetic field source. The displacer device contains at least one magnetorheological fluid as a working fluid and can be operated thereby in order to set a damping of the rotary movement. At least one end-side axial gap is formed between the housing and the displacer device. At least a substantial part of the magnetic field of the magnetic field source passes through the axial gap between the housing and the displacer components.

Preferably, the rotary damper has a damper shaft. The displacer device has preferably mutually engaging displacer components. Thus a rotary movement of the damper shaft can be damped. In particular, the magnetic field source comprises at least one electrical coil.

A rotary damper according to the invention, in a preferred embodiment, has the following features. The rotary damper comprises at least one displacer device. The displacer device has a damper shaft and mutually engaging displacer components which in particular rotate. Thus a rotary movement of the damper shaft can be damped. The displacer device contains a magnetorheological fluid as a working fluid. At least one control device is provided. Furthermore, at least one magnetic field source is provided or included which comprises at least one electrical coil. The magnetic field source can be controlled by the control device, and the magnetorheological fluid can be influenced by the magnetic field in order to set a damping of the rotary movement of the damper shaft. At least one end-side axial gap is formed between the housing and the displacer device. A substantial part of the magnetic field of the magnetic field source passes through the axial gap between the housing and the displacer device, and in particular the displacer components, and thus creates a seal of the end-side axial gap.

The rotary damper according to the invention has many advantages. A considerable advantage of the rotary damper according to the invention is that the displacer device is filled with a magnetorheological fluid as a working fluid. In this way, controlled by a control unit, the magnetic field of the magnetic field source can be set in real-time, i.e. in a few milliseconds (less than 10 or 20 ms), and hence the braking moment applied to the damper shaft can also be set in real-time. The structure of the rotary damper according to the invention is simple and compact and it requires few components, so that the rotary damper itself can be produced economically as a (large-)series production part.

Preferably, an end-side axial gap is formed between the housing and the displacer device at both axial ends of the displacer components. Here, a substantial part of the magnetic field of the magnetic field source passes through both axial gaps between the housing and the displacer components, and creates a seal of the end-side axial gaps because the carbonyl iron particles of the magnetorheological fluids interlink under the influence of the magnetic field and hence form a virtual "seal".

The term "rotary damper" in the sense of the present invention means that parts of the rotary damper must rotate relative to each other in damping mode. This means that the displacer components, wetted with the magnetorheological fluid, rotate relative to each other on damping.

Preferably, at least two electrical coils are provided. Preferably, at least one electrical coil is assigned to each axial end or each end face.

The displacer device is in particular configured as a type of compressor or pump. The displacer device has mutually engaging displacer components which rotate in operation. Inside the displacer device, a displacer chamber is provided which could also be called a compressor chamber. A magnetorheological fluid is contained as a working fluid inside the rotary damper, and in particular is located in the interior of the housing of the rotary damper or interior of the displacer device. The mutually engaging displacer components are wetted by the magnetorheological fluid.

In all embodiments, it is possible and preferred for the displacer components to be configured as toothed components or gearwheels. The mutually engaging displacer components in particular intermesh with each other. The use of oblique toothing components is also possible, for example spindle screws or other intermeshing or mutually engaging contours or Roots blower contours. The engagement of the displacer components changes the chamber volume in operation.

In all embodiments, it is possible and preferred for the magnetic field source to comprise at least one additional permanent magnet. A permanent magnet allows a targeted static magnetic field to be created, in order for example to generate or provide a base moment of specific amount. This magnetic field of the permanent magnet may be strengthened or weakened in targeted fashion by the electrical coil of the magnetic field source, so that the magnetic field can be set preferably arbitrarily between 0 and 100%. This results in a corresponding braking moment which can also be set preferably between 0% and 100%. When the magnetic field is switched off or reduced to a very low value, it is possible to generate a low base moment.

In preferred embodiments, a first displacer component of the displacer components is fixedly connected to the damper shaft, and a second displacer component of the displacer components is received rotatably in a housing of the displacer device or rotary damper. Here, the first displacer component is in engagement with the second displacer component and is preferably arranged eccentrically to the second displacer component. This means that the rotary axis of the first displacer component is arranged preferably eccentrically to the rotary axis of the second displacer component. In preferred embodiments, the damper shaft is received at least in portions in a housing of the displacer device or in the housing of the rotary damper.

Preferably, the first displacer component has an external toothing, and the second displacer component has an internal toothing. Here, the second displacer component is received preferably rotatably in the housing. In such embodiments, the first displacer component may also be called the inner displacer component, and the second displacer component the outer displacer component.

It is preferred that an interior of the displacer device can be exposed to a substantial part of the magnetic field of the magnetic field source. This means that in particular at least one part, and preferably the majority of the interior, and particularly preferably the entire or almost the entire interior of the displacer device, can be exposed to the magnetic field of the magnetic field source.

In preferred refinements, the displacer device comprises at least one damping channel which can be exposed to the magnetic field of the magnetic field source. In particular, the damping channel can be exposed to a substantial part of the magnetic field. The damping channel may be configured as a damping gap or at least comprise such a gap.

In all embodiments, it is preferred that a damping gap, or at least one damping gap, is arranged as a damping channel radially between the second component and the housing. This damping gap preferably extends in the radial direction between the second component and the housing, and may preferably be configured as a ring gap or ring channel. The ring gap or ring channel may be divided into several segments. Preferably, the damping gap can be exposed to the magnetic field of the magnetic field source in a targeted fashion. A targeted magnetic field may be achieved for example by a targeted current intensity of the electrical poles.

Preferably, at least a substantial part of the magnetic field of the magnetic field source passes through the damping gap. This means that at least a substantial part of the magnetic field lines of the magnetic field pass through the damping gap. For example, the magnetorheological fluid may be conducted through the inside of the displacer device and returned through the damping gap between the housing and the displacer components.

Preferably, the second displacer component is guided rotatably in the housing via a plurality of guide units. In this way, a defined damping gap between the second displacer component and the housing can be guaranteed. The guide units are preferably arranged substantially symmetrically or regularly around the periphery of the second displacer component. Each guide unit may extend over part of the axial length of the second displacer component, and also over almost the entire or the entire axial length of the second axial displacer component in order to provide a defined damping gap. The guide units may be configured as slide units or as bearing units and are distributed over the periphery. The guide units may also be configured as sliding blocks, and for example have a substantially cylindrical form. Here it is possible that one side is flattened more greatly in order to enlarge the surface area lying on the housing inner side. The sliding blocks may be made of brass, bronze or similar materials. In particular, the sliding blocks or guide units have a low magnetic relative permeability. Here it is possible that the damping gap, formed for example as a ring gap, is divided by the guide units into several gap segments or angle segments.

Also, just one segment-like damping gap may be formed between the second displacer component and the housing, wherein this need not extend over the entire periphery.

Preferably, the housing comprises a first and a second end region and in some cases a middle region in between (or two or more middle regions or housing parts in between). (At least) one electrical coil is received in at least one of the two end regions, and in particular in both end regions. Here, an axis of the coil is oriented in particular substantially parallel to the damper shaft. The axis of the coil may be an axis of symmetry, or for example an axis which extends perpendicularly to the cross-section of the coil.

Particularly preferably, the housing comprises housing portions adjacent to the displacer components. The housing portions are arranged on the end faces of the displacer components (opposite each other) and each axially adjoin the (side ends of the) displacer components or are separated from the displacer components by a slight axial gap. The axial gap extends in the radial direction. The axial gap preferably has a width in the axial direction which is greater than a typical size of the largest (carbonyl iron) particle within the magnetorheological fluid (MRF). This ensures that the displacer component is not crushed, seized, jammed/caught or similar on the housing portion, since the (iron or carbonyl iron) particles penetrating into the axial gap have a smaller outer diameter than the gap width. Preferably, the axial width of the axial gap is more than 5 µm and in particular more than 10 µm or 20 µm.

It is possible and preferred for the damper shaft to be provided at an end region at which it is accessible or from which it protrudes. Preferably, the damper shaft protrudes from the housing only on one side.

In preferred refinements, the housing consists at least substantially of a magnetically conductive material with a relative permeability of more than 100. In particular, the relative permeability is more than 500 or more than 1000. Here it is possible that the entire housing consists of such a material, or substantially or at least to a substantial part thereof. Particularly preferably, at least one of the housing portions adjacent to the displacer components consists of a magnetically conductive material.

Preferably, a ring made of a material with a relative permeability of less than 10 is arranged axially adjacent to the electrical coil in the housing. The ring is in particular arranged axially between the electrical coil and the displacer components. Particularly preferably, the ring and/or the electrical coil is/are situated substantially or almost completely or completely radially further out than the axial gap present between the displacer component and the housing portion. The term "almost completely" here means that the proportion radially outside is greater than 80%, and in particular greater than 90%. Particularly preferably, the ring is axially next to and adjoining a middle part of the housing. The relative permeability of the ring material is in particular less than 5, or even less than 2. To this extent, the ring preferably consists of a magnetically non-conductive material. The ring may e.g. consist of austenitic steels. The material of the ring has a magnetic permeability such that a magnetic short-circuit of the magnetic field of the magnetic field source is reliably prevented.

Preferably, a substantial part of the magnetic field of the magnetic field source passes through an or the axial gap between the housing and at least one of the displacer components. This means that the axial gap between the displacer components and the housing is also exposed to a substantial part of the magnetic field of the magnetic field source. In this way, a sealing effect is created inside the axial gap, and in addition the damping is also increased. Also, the magnetic field and the resulting sealing effect (interlinking of the carbonyl iron particles) prevents a pressure loss inside the axial gap due to overflowing magnetorheological fluid. The magnetic field lines here run preferably transversely to the sealing face and not in the extension direction of the gap.

In preferred refinements, the magnetorheological fluid can be conveyed from an inlet of the displacer device to an outlet of the displacer device by a rotational movement of the mutually engaging displacer components. It is possible that at least one pressure sensor is provided at the inlet and/or at the outlet.

Preferably, the damper shaft protrudes out of the housing on the inlet side of the displacer device. There in particular, a seal is provided between the damper shaft and the housing. Protrusion of the damper shaft on the inlet side is advantageous since the magnetorheological medium or fluid is drawn in there, and hence a lower pressure prevails on the suction side.

In all embodiments, it is particularly preferred that the inlet and the outlet are arranged on different axial sides of the displacer device. Thus a possible pressure loss from an undesirable direct overflow of magnetorheological fluid from the outlet to the inlet is reliably avoided. It is however also possible to provide the inlet and outlet on the same axial side. Then the inlet and outlet may for example each be formed approximately kidney-shaped, wherein a seal is created between the inlet and the outlet, for example also via the magnetic field of the magnetic field source.

In preferred embodiments, the magnetic field is preferably formed weaker in a region of the inlet than in a region of the outlet. This measure prevents cavitation.

Preferably, at least one compensation volume is provided in order to allow a leakage or temperature compensation. Such a compensation volume may comprise an air bladder or contain another compressible material, in order to compensate for a change in the volume of the magnetorheological fluid due to temperature differences.

Preferably, the damping circuit of the magnetorheological fluid is arranged completely inside the housing. This means that preferably no external inlet or outlet is provided through which magnetorheological fluid flows. A closable inlet and/or outlet may be provided solely for filling or drainage.

In all embodiments, it is possible that at least one external damping valve with at least one valve channel as a damping channel is provided. Then the external damping valve is connected to the displacer device via corresponding fluid lines.

In other embodiments in which no external damping valve is provided, it is preferred that a substantially closed volume is present in the displacer device or in the rotary damper. This allows a particularly simple construction and economic production, partly because of the smaller quantity of magnetorheological fluid thus required.

In all embodiments, it is preferred that an angle sensor is provided which detects a dimension for an angular position of the damper shaft. An angle sensor, or at least one angle sensor, may for example be configured as an absolute rotary angle emitter.

In preferred refinements, at least one load sensor is provided for detecting a key value for a torque on the damper shaft (e.g. torque sensor).

Preferably, other types of sensor may be used e.g. force sensors, speed sensors or acceleration sensors or similar.

In all embodiments, it is preferred that at least one electric motor or similar is provided which can be coupled to the damper shaft. Such an electric motor may drive the damper shaft in controlled fashion. It is also possible to generate energy, using the electric motor as a generator, if the damper shaft is driven differently. In all embodiments, it is also possible to use at least one preliminary gear mechanism.

In all embodiments, the damper shaft may be coupled to an electric motor directly or indirectly, for example via a gear mechanism.

The rotary damper may comprise also at least two, in particular hydraulically mutually connected, displacer devices. In this way, even more complex processes can be controlled.

Preferably, at least one external and in particular hydraulic actuator stands in fluidic connection with the displacer device. Then a hydraulic actuator can be driven in controlled fashion by the displacer device.

It is possible and preferred for at least one actuator to be formed as a piston-cylinder unit. Then the displacer device can move the actuator in the one direction and in some cases also in the other direction.

Preferably, the rotary damper comprises at least one sensor device, or at least one sensor device is assigned to the rotary damper. The sensor device may comprise at least one position and/or distance sensor for detecting a position and/or a distance from surrounding objects. Preferably, the control device is configured and designed to control the rotary damper depending on the sensor data of the sensor device. In this way for example, it is possible to control the rotary damper, when used for example in a prosthesis, depending on the distance from steps or furniture or similar.

Preferably, the displacer device is configured such that because of a rotary movement of the displacer components, a periodic enlargement or reduction of the displacer chamber occurs and thus a pressure is set. In particular, the amount of the pressure is determined by the magnetic field unit.

In all embodiments, it is preferred that at least one energy store is provided. In particular, the energy store is rechargeable. The energy store is in particular configured to be mobile and is arranged on or in the rotary damper or integrated therein. For example, the energy store may be configured as an accumulator or battery.

In another embodiment of the rotary damper according to the invention, this comprises at least one displacer chamber. The rotary damper has a damper shaft and mutually engaging components, wherein a rotary movement of the damper shaft can be damped. Here, the rotary damper contains at least one magnetorheological fluid as a working fluid. A control device is provided. The control device can control a magnetic field of a magnetic field source comprising at least one electrical coil. The magnetic field can influence the magnetorheological fluid in order to set a damping of the rotary movement of the damper shaft.

The invention is also directed at an apparatus comprising at least one rotary damper as described above. For example, the rotary damper may be used to damp a rotary movement between two components, wherein for example a rotary movement of a car door or a tailgate of a motor vehicle, or a wing door or hood, is damped. It may also be used on a machine, in order to damp rotary movements thereon.

The apparatus may comprise at least one winder such as a coiling machine or a weaving machine with at least one rotary damper.

Preferably, the device may be configured as a prosthesis and comprise at least one rotary damper as described above. A prosthesis may be provided for a hip, a foot or an arm, and comprise at least one rotary joint with a rotary damper. Use or configuration of the apparatus is also possible as an orthosis which comprises at least one rotary damper. Correspondingly, orthoses may also be equipped accordingly.

The apparatus may also be configured as a device for support during sport, rehabilitation or fitness exercises. At least one rotary damper is provided as described above.

The device may also be used in exoskeletons, robots, motorcycles or bicycles. In bicycles in order for example, to damp the front or rear wheel swing arm of a bicycle.

The invention allows damping of rotary movements of a damper shaft. Here the damper shaft may turn through several or a multiplicity of revolutions.

The displacer devices described herein may be constructed extremely compactly and produced very economically. There is great technical interest in making the displacer devices usable for high pressure ranges. In order to be able to generate these high maximum pressures effectively, it is suitable to develop better sealing mechanisms than those already present (mechanical sealing effect via gap sizes). This is achieved here via the magnetorheological fluid (MRF) which is used as a working fluid in the displacer device. An improved seal is achieved if, in targeted fashion, regions of the displacer device or pump are magnetized on use with MRF so that less leakage occurs in critical regions, such as the region between the inflow and outflow channels (inlet and outlet) and the (axial and radial) gaps, hence higher maximum pressures are achieved.

For this, preferably, at least some of the gaps or all gaps are magnetized in targeted fashion with the magnetic field source so that a sealing effect is created, and in particular the gaps are sealed. The iron particles of the MRF are transferred specially oriented to these points, and an additional sealing effect is achieved.

In this way, an end-side seal of the iron particles can be created between the suction and pressure sides or at the gaps to provide a seal in the gap and at the end faces.

In a rotary damper with MRF, the energy input is used to generate pressure, and then the generated pressure is dissipated again in a magnetized valve unit or directly in a damping channel which is controlled or regulated by the current of the magnetic field source. The rotational energy introduced is converted into a volume flow by the displacer device acting as a pump, wherein the desired braking moment is set via the electromagnetic MRF control valve or the damping gap.

The result is a rotary damper in which the force development can be controlled steplessly, variably and very quickly via the current. A further possible advantage is that the entire magnetization can already take place in the displacer device itself. Thus the valve unit can be integrated compactly. Such a hydraulic structure with magnetizing displacer device and integrated hydraulic valve has a very simple construction with a high performance level, and is therefore an interesting solution variant for many technical applications.

It is also possible to use the displacer device not only for direct pressure generation, but also to configure this as a pump and perform electromagnetic resistance work by the rotary movement of the displacer device and magnetization of the gaps. This resistance work can be regulated via the current. There is no need for a separate valve unit. The device can be constructed very compactly.

A further application possibility for the rotary damper is use in the hydraulic circuit. One advantage is the possibility of real-time control of an actuator such as e.g. a hydraulic cylinder. The stepless control of the valve units from 0 to 100% in the millisecond range allows a very high system dynamic. The working method of the individual damping channels, together with the magnetic field source and its switch logic, can be constructed in the same way as a bridge circuit in electronics.

In all embodiments, it is possible that the inlet and the outlet lie on the same side. In the case of small or very small grooves or imprecisions, an overflow can however occur across the small intermediate web. Therefore it is more favorable to place the inlet and outlet openings on different end faces, even if the axial gaps must be sealed by the MRF. Preferably, the axial gaps are sealed on both end faces by the magnetorheological fluid (MRF).

It is also possible to construct a double pump in which the pressure channel of the one pump is connected to the suction channel of the other pump. The switchable MRF valve lies in between. The damper shafts of the two pumps or displacer devices are connected. Instead of one broad pump with the disadvantage of long suction travels, two narrower ones are constructed which "pump" reciprocally.

With regard to the working method of the displacer device, it is clear that, in a specific position and considering a single "tooth chamber" in the region of the inlet channel, the tooth volume initially increases, whereby the working fluid is sucked in. On further rotation, as soon as no further communication is possible between the inlet and the tooth chamber, the tooth volume must remain approximately constant since no further volume compensation is possible. Then the tooth chamber is opened in the direction of the outlet. The reducing tooth chamber compresses the delivery medium and a pressure is built up.

In the rotary damper with suction side and pressure side on different end faces, the MRF is conveyed from the one side (suction level) to the other side (pressure level). The pressure level and the suction level are connected radially via the ring gap between the second displacer component and the inside of the housing. This damping gap is used as an "MRF valve". When a magnetic field is applied to the magnetic gap, a pressure difference is generated and the drive moment increases.

Parts moving relative to each other usually require a running play (gap) for smooth function. Thus a radial gap must exist between an outer tooth profile and an inner tooth profile (outer rotor to inner rotor). In particular, the end-side (axial) gaps are decisive for the amount of pressure build-up, so that no or very little overflow results. In order to keep the losses from internal leakage as small as possible, preferably all separation/transition/gap points in the displacer device are exposed to a magnetic field, whereby the MR fluid creates an additional seal (quasi-magnetic seal). In this way, the displacer device may be produced with larger tolerances and hence more cheaply; or with small tolerances, higher pressures (braking moments) are achieved. Also, lower idle pressures (large gaps in OFF state) and higher maximum pressures (braking moments) when powered (ON state) can easily be achieved.

A suitable material for the parts of the displacer device made of magnetically conductive material is for example S235.

When an active system is used on a prosthesis, additional functions of the prosthesis may be fulfilled e.g. the patient can stand up. Furthermore, it is possible to implement an energy recovery system. The torque introduced from the outside, e.g. from sitting down, is converted via the rotary damper, which in this case serves as a pump, into "hydraulic energy"; this can then be converted into electrical energy if the drive motor is used as a generator, or if the "hydraulic energy" is stored in a pressure store.

In all cases, when several actuators are used, it is possible to interconnect the various actuators "intelligently". Thus the braking pressure in one unit can be used to actuate the other unit so that a harmonious movement sequence is possible. Thus for prostheses, the knee can be "interconnected" with the hip or foot. However, in an exoskeleton or robot, also all joints can be linked together.

A compensation volume to compensate for temperature and/or leakage is preferably arranged on the intake side since a lower pressure level prevails there. On the suction side, the magnetic field may be weaker so that no cavitation occurs on suction. This is indeed a closed circuit, but on temperature changes or expansion, this increases the safety.

MRF clutches according to the prior art are cylindrical actuators in which discs rotate in MRF. Except for the flow movements resulting from rotation, the MR fluid always remains pressureless in the MRF chamber. A necessary cooling to dissipate the energy is possible only via the outer housing. In the rotary damper according to the invention with external damping valve, the MRF flows via lines and is used as a working fluid in the displacer device. Thus a separate cooler may be fitted here.

For applications with only very short runtimes (e.g. <100 ms), soft materials with low surface hardness are suitable for components. Because of the desired magnetic properties, here low-alloy steels are advantageous. For longer usages, the surface hardness should be higher, which can be achieved e.g. by hard chrome coating or similar.

The rotary damper may also be used in winders, e.g. for coil winding or in weaving machines. If e.g. a medium such as for example paper, thread or similar must be wound onto a roller with constant tension, this can be achieved using the invention by varying the drive or braking moment according to the diameter change of the winding roller.

The invention may also be used for fitness, rehabilitation or sports devices, e.g. in weightlifting machines, rowing machines, training cycles, treadmills, lifting devices etc.

Further areas of application are adaptive brakes in fitness devices (e.g. rotation), on training cycles, treadmills, for levers in weightlifting, on rowing machines, or for conversion of linear movements into rotation, e.g. for weightlifting.

It is also possible to use an angle sensor to set a travel- or angle-dependent counter-force, or a travel- or angle-dependent counter-moment. In modern fitness machines (primarily with weights), the counter-force (counter-moment) remains constant over the movement travel or angle (gravity). With the rotary damper, it is possible to adapt the force according to the optimum effect for the muscle or person. This may also be dependent on the positions of the joints. It is possible and may be advantageous for the counter-force to rise or fall slowly, so that no load peaks etc. occur.

In all embodiments, it is possible to link the rotary damper or an apparatus equipped therewith to a computer or handheld computer, such as a Smartphone or smart device, and/or record data or settings or also make adjustments. The ideal setting can always be programmed in the computer/Smartphone. As soon as the user enters the fitness center or rehabilitation, this can be transferred to the fitness machine and the data later evaluated. A temporal development (training success) is also possible.

A further advantage is a weight-saving since the devices are lighter. The rotary damper may be fully adaptive and networkable. Force over travel (work) or for a specific time (power) is measured and taken into account. A comparison with others can take place via the internet.

The profiles may be updated via a network or the internet. Thus results can be exchanged and new characteristic curves entered.

For rehabilitation devices, functions may be implemented such as those for the sports machines described above, but these may also be optimized for faster and good recovery.

For prosthetics, often approximately 60 to 150 Nm braking moment is required, which the rotary damper in suitable design can provide.

With the rotary damper or a device equipped therewith, a movement conversion from rotational to linear can take place, or via levers into other movement forms. It is also conceivable to use the rotary damper on a mine protection seat.

The rotary damper may also be used on motor vehicles to damp the rotary movement of a door or other components. Thus e.g. the rotary damper may be used in the A-pillar without using a gear mechanism in order to brake the door on opening or closing.

When used e.g. on a car door, a semiactive or active system is also possible. Here the invention may be configured as an apparatus and in particular as a door component. Here, the door component comprises at least one controllable rotary damper containing a magnetorheological fluid as a working fluid. The rotary damper comprises a displacer device with a damper shaft and with mutually engaging displacer components. The displacer device contains at least one magnetorheological fluid as a working fluid and can be operated thereby. During a rotation of the displacer components relative to each other, these displace the magnetorheological fluid. At least one magnetic field source is included. The magnetic field source has at least one electrical coil. A magnetic field of the magnetic field source can be controlled and hence a rotary movement of the damper shaft can be damped in controlled fashion. The rotary damper comprises two connection units which are movable relative to each other, wherein one of the two connection units can be connected to a carrier structure and the other of the two connection units to a movable door device, in particular of a vehicle, in order to damp a movement of a movable door. The rotary damper is coupled to a drive device with which the door device can be moved actively in at least one direction. Preferably, the movable door can be moved under active control in both directions. In particular, an electric motor coupled to the rotary damper is suitable for the drive. Such an electric motor may be coupled to the damper shaft directly or via a gear mechanism.

Use is also possible on the rear wheel swing arm or front wheel swing arm of cycles.

For motor vehicles or in motorsport, the rotary damper may also be used in a stabilizer or as a part thereof.

A combination of the displacer device with an electric motor (plus gear mechanism) and/or pressure store is possible, so that not only semi-active but also active applications are possible. A quite considerable advantage of such a combination is that the electric motor need only provide a considerably lower torque than that which the rotary damper can brake. In this way, an electric motor may be used which in some cases may be coupled to the rotary damper via a preliminary gear mechanism. The electric motor and also the preliminary gear mechanism may be configured economically since they are designed for low loads. The rotary damper however is suitable for considerably higher braking moments and may also be produced economically. The resulting total costs are much lower than with a design with an electric motor which can generate corresponding braking moments.

Use of a thermal actuator (form memory) as an "active" actuator is also possible.

Preferably, this is designed for short-term use such as in crash application, i.e. for periods between for example 20 ms and 100 ms. In particular, the process to be damped lasts less than 100 ms. Preferably, no cooling is used.

It is possible and preferred to convey or pump the MRF. Preferably, a closed-circuit exists in which a rotary movement is damped or braked.

In all embodiments, the pressure fluctuations generated by the displacer device may be smoothed out via regulation of the magnetic field intensity of the magnetic field source. Such pressure fluctuations may occur since there is no constant volume flow through the tooth profile of the displacer components.

The invention is also directed at an apparatus or machine with magnetorheological fluid as a working medium which, at rotation speeds above 500 rpm, can generate a stepless, adaptive braking moment of up to 50 Nm (or more). The invention is also directed at an apparatus or a machine with magnetorheological fluid as a working medium which, at rotation speeds above 2000 rpm, can generate a stepless, adaptive braking moment of up to 100 Nm or 130 Nm.

An apparatus according to the invention, at several hundred revolutions per minute, generates high braking moments, in particular greater than 50 Nm or greater than 100 Nm. For structural reasons, no substantial separation of the constituents of the MRF takes place here.

In a preferred embodiment, the invention is directed at a safety steering column of a motor vehicle, wherein the safety steering column comprises two units which are movable relative to each other and at least one rotary damper as described above.

As a whole, the invention offers many advantages and possible applications. MRF brakes according to the prior art, with two or more discs moved relative to each other following the clutch plate principle or MRF shear principle, are large and complex in construction and cannot be operated at several hundred revolutions per minute, since the magnetorheological fluid centrifuges out. The invention provides a new working principle with better performance data. Such an MRF brake can be operated with high to very high rotation speeds of up to and over 2000 rpm, is many times smaller and simpler in structure than in the prior art, and can be produced economically.

On the test bench, a first prototype achieved a braking moment of over 25 Nm with dimensions of 65 mm diameter and 60 mm length.

By scaling, the moment can be varied arbitrarily. The installation length of the brake unit (now 20 mm wide) increases linearly therewith, and the diameter progressively. Such a rotary damper can be operated in both rotation directions.

The first prototype has a base moment of around 1 Nm when unpowered. Rotation speeds of >2000 rpm are possible. The coil resistance in the concrete prototype is 1.6Ω. This gives a power of 1.6 W for a current of 1000 mA and a braking moment of 15 Nm. A power of 6.4 W can be achieved at 2000 mA with a braking moment of 21 Nm. A power of 10 W is achieved with a current of 2500 mA and a braking moment of 24 Nm.

An extremely wide working range is achieved with a factor of 25 between the minimum and maximum force. This gives more flexibility in the minimum force, and a low force is possible at low temperatures. This leads to a wider area of application, wherein e.g. different devices can be covered with the same system. The rotary damper can be used in both rotation directions. Several revolutions are possible, i.e. it need not be positioned precisely on installation. The start and end positions are arbitrary. The same actuator may be used for various displacement travels and revolutions, which makes the rotary damper more economic because of the concept of same parts.

Another advantage is that the system is closed and sealed in itself, which also entails advantages on ageing.

Because of the different action principle (pumping=mixing), sedimentation does not cause a problem or does not occur.

The rotary damper can still be produced economically.

Conversion of a linear movement into a rotational movement can take place via a pinion and toothed rack, but threaded spindles or other translational gear mechanisms are also conceivable. Thus e.g. an energy-absorbing/energy-converting movement of a safety steering column in an accident can be damped in targeted fashion, in that a gearwheel coupled to the adaptive damper intermeshes with a toothed rod connected to the steering column. In addition, in the event of damage (crash, collision etc.), an effective damping of the telescopic safety steering column is achieved, and hence a passenger restraint system which reduces injury. If the rotary damper is coupled to an electric motor, an active movement of the steering column is possible not only in the event of damage but also in normal operation.

If the system is to be regulated, a simple and economic travel sensor is possible, since rotary emitters are usually much simpler and cheaper than linear travel measurement systems.

As a whole, the rotary damper can be used e.g. as rotation hydraulics, an MRF rotation brake, an MRF pump, an MRF brake, an MRF damper, a passive or active MRF actuator.

It may also be used in varying technical fields. The rotary damper may be used for example as a crash absorber, in hydraulics, on or in prostheses, on or in or for robots, or on or in or for exoskeletons. Furthermore, the rotary damper may be used on an (active) suspension or on a motorcycle or cycle, e.g. on the rear wheel swing arm.

Further advantages and features of the present invention arise from the exemplary embodiments which are explained below with reference to the attached figures.

BRIEF DESCRIPTION OF THE SEVERAL VIEWS OF THE DRAWING

FIG. 5 the depiction from FIG. 4 with the magnetic field lines drawn in;

DESCRIPTION OF THE INVENTION

Figure 1:
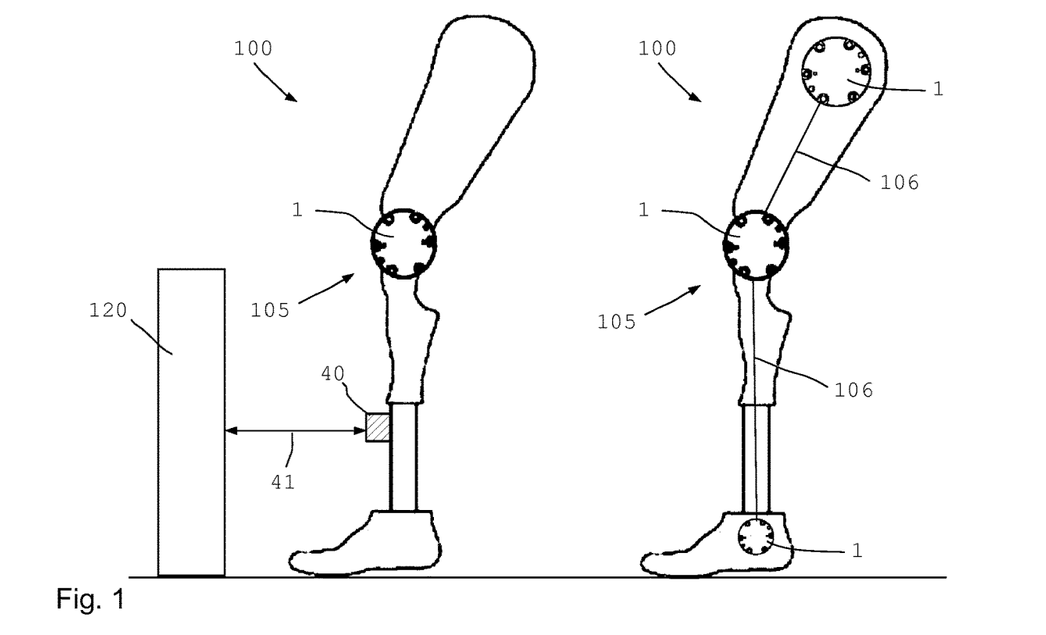
FIG. 1 rotary dampers according to the invention on prosthesis.

FIG. 1 shows the use of a rotary damper 1 according to the invention on prostheses 105 as apparatus 100. The prosthesis 105 shown in the left half depicts use on a knee joint, where the rotary damper 1 damps rotational movements between the thigh and the lower leg.

The rotary damper 1 can also be controlled via sensor data from a sensor device 40, which for example detects a distance 41 from an object 120. If for example when climbing steps, the distance and height of successive steps are detected by such a sensor device 40, the rotary damper 1 may be set in targeted fashion to the following requirement.

The right half of FIG. 1 shows a leg prosthesis as a prosthesis 105, wherein here three rotary dampers 1 are provided, namely one in the ankle, one in the knee and one on the hip joint. The three rotary dampers 1 are connected together via one or more fluid and control lines 106, so that a hydraulic interaction is possible between the individual rotary dampers 1, the function of which will be described later.

Figure 2:
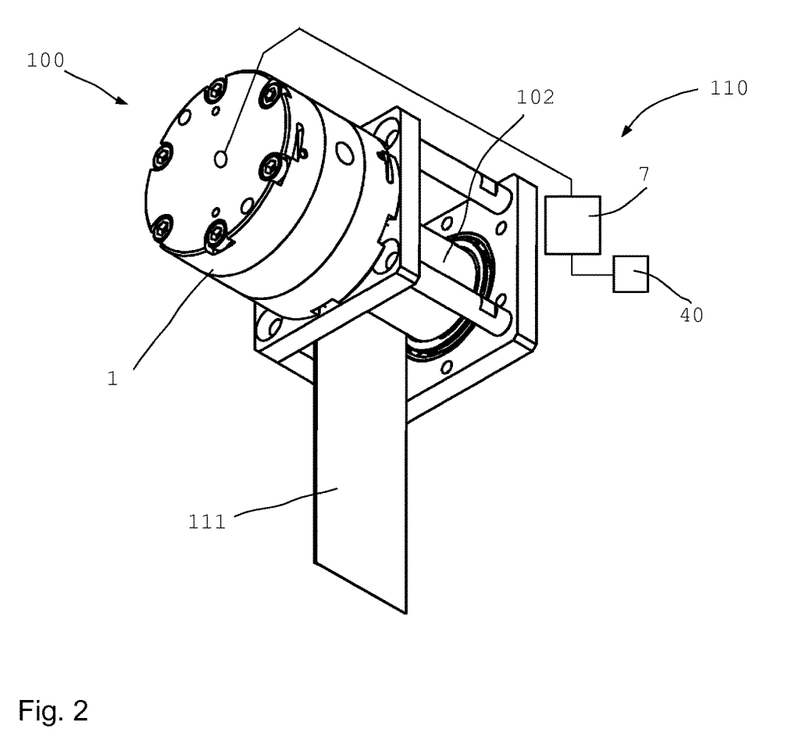
FIG. 2 a rotary damper according to the invention when used in a sports machine.

FIG. 2 shows the use of a rotary damper 1 on an apparatus 100, such as for example a sports machine 110 (e.g. strap traction station, load traction device, force station, chest press etc.) which may be used in sport or rehabilitation or fitness exercises or similar. Here, the sports machine 110 has a strap 111 which can be unwound from or wound onto a cable reel 102.

The rotary damper 1 may in some cases be supported by a spring or an electric motor 35 (not shown here) in order to damp or control a targeted winding or unwinding of the strap 111. Control is provided by the assigned control device 7 which uses data from the sensor device 40 and any further sensors.

Figures 3, 3B:
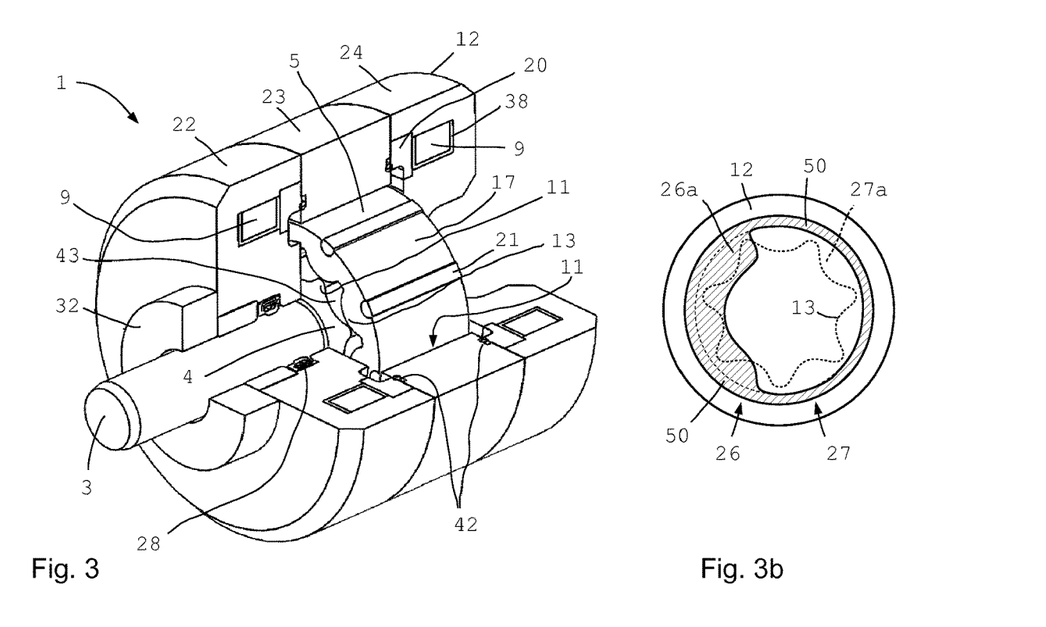
FIG. 3 the rotary damper from FIG. 1 or FIG. 2 in a partial view.
FIG. 3b a diagrammatic top view of an end region of the housing of the rotary damper from FIG. 1.

FIG. 3 shows a partial cross-section of the rotary damper 1 from FIG. 2, wherein the outer toothing 11 of the first displacer component 4 and the inner toothing 13 of the second component 5 can be seen.

Here it is also evident that the housing 12 of the rotary damper 1 comprises three portions, namely a first end region 22, a middle region 23 and a second end region 24. Each region here is formed by a separate part. It is also possible that more parts are provided, or that in total only two housing halves are provided.

A respective electric coil 9 is received in a coil holder 38 in the end region 22 of the housing 12 shown on the left and in the second end region 24 shown on the right. The magnetic fields from the electrical coils 9 serve to influence the magnetorheological fluid present in the interior of the displacer device. Here, the magnetic fields of the electrical coils 9 seal the two end-side axial gaps 25.

The rotary damper 1 is extremely compact in structure and can be produced very economically, and can be used in high pressure ranges of up to 100 bar and 200 bar or above when dimensioned accordingly. To achieve such high maximum pressures, sealing mechanisms are used. Favorable mechanical gap sizes are used. Also, regions of the displacer device and housing 12 are magnetized in targeted fashion as required, such that less leakage occurs at critical regions such as the region between the inflow and outflow channels and at the axial gaps 25, and hence higher maximum pressures can be achieved. The regions between the inlet and outlet, and the axial gaps, may be magnetized such that the iron particles of the MRF are oriented specially at these points and perform a substantial additional sealing effect.

At the axial gaps 25 next to the suction nipple and the pressure nipple, the magnetic field leads to an end-side seal by an interlinking and orientation of the iron particles. The end-side axial gaps 25 are reliably sealed against even high pressures. The leakage between the pressure and suction side is low. Optimization of the sealing effect allows the use of gear ring pumps as rotational MRF dampers. A compact and favorable rotary damper is possible.

In an MRF damper unit, introduced energy is used to generate pressure and then the generated pressure is dissipated again in a magnetized valve unit which is regulated via the current. The rotational energy introduced is converted via the pump into a volume flow, wherein the desired braking moment is set via an electromagnetic MRF control valve. Here, the volume flow is damped directly inside the housing.

The result is a rotary damper 1 in which the force development can be regulated steplessly, variably and very quickly via the current. The entire magnetization may already take place in the rotary damper 1 itself, which allows compact integration of the valve unit. Such a hydraulic construction with magnetizing pump unit has a very simple structure with a very high performance level, and is an interesting solution variant for many technical applications.

A ring 20 is provided axially adjacent to each electrical coil 9, wherein the rings 20 are arranged between the two coils 9 and here each adjoin the middle region 23 from the outside. The rings 20 are arranged axially adjacent to the electrical coils 9 in order to prevent a magnetic short-circuit there, as will be explained in more detail below with reference to FIGS. 4 and 5.

An angle sensor 32 is provided on the damper shaft 3 and may for example be configured as an absolute rotary angle emitter. The damper shaft 3 is sealed from the interior 16 via a seal 28. Peripheral seals 42 are arranged between the housing parts of the different regions in order to prevent the escape of magnetorheological fluid from the interior of the displacer device 2, here radially outward through the interfaces between the parts 22, 23 and 24.

The second displacer component 5, with a generally approximately cylindrical outer form, has several guide units 21 on the outer periphery; in this exemplary embodiment, these extend over the complete axial length, but in other embodiments for example may also be configured shorter. The guide units 21 protrude radially outwardly over the second displacer component 5 or the core material of the second displacer component 5, and ensure a defined radial distance between the outer surface of the core material of the second displacer component 5 and the inner periphery of the housing 12 in the middle region 23.

FIG. 3b shows a highly diagrammatic top view of an end region 22 or 24 of the housing 12 of the rotary damper 1 according to FIG. 1, wherein the inner structure of the rotary damper 1 and the flow guidance is clearer. The drawing shows e.g. the end region 22 in a top view from the inside but without the displacer component 4. The inner contour 13 of the outer displacer component 5 is drawn in dotted lines, and may have more or fewer teeth in different embodiments. Here, a peripheral groove 50 is provided in the end region 22 (and 24), radially outside the radially outermost tooth contour of the displacer components 4 and 5, and extends completely around the axis in the end region 22 (and 24). This peripheral groove 50 serves as a collection (50) or distribution channel (51) for the MRF. The peripheral groove may however also extend only over part regions of the periphery.

On the left side of the drawing shown here, a suction nipple 26a is provided on the suction side 26 or on the inlet, through which the MRF can be drawn into the intermediate space 43 between the inner toothing 13 and the outer toothing 11. For this, the MRF drawn in through the suction nipple 26a flows from the pressure side 27 through the damping channel 17 or its part segments to the suction side 26. The damping channel 17 here extends over (almost) the complete outer periphery of the outer displacer component 5. For example, the narrow segments of the guide units 21 may be missing from the complete periphery.

The suction nipple 26a, and the pressure nipple 27a formed in the other end region on the other end face, each extend approximately kidney-shaped over an angular region of <180°, as usual in gear ring pumps or gerotor pumps. The peripheral groove 50 and suction nipple 26a together form a supply channel, while the peripheral groove 51 and the pressure nipple 27a together form a discharge channel.

The collection groove 50 on the suction side and the collection groove 51 collect the MRF on the suction side and discharge it on the pressure side over the complete periphery. A "cross-talk" or fluid short-circuit is excluded in that the collection grooves 50 and 51 are arranged on different end faces, so that the suction and pressure sides are here also separated from each other axially. The MRF is collected or distributed in the region of the suction nipple or pressure nipple, the depiction of which can be obtained from the horizontal mirror image of FIG. 3b. The collection groove 51 may also be called a distribution groove 51.

The suction and pressure nipples may be provided on the same end face, wherein then the (fully circumferential) collection grooves 50 and 51 must be omitted since otherwise a fluid short-circuit would occur. The collection grooves need not extend over the complete periphery. This also applies to the damping channel 17.

It is also conceivable that the damper shaft 3 remains stationary and the housing 12 of the rotary damper 1 rotates around the damper shaft 3, and the housing 12 thus functions as a damper. The current supply may here take place via slip rings or similar.

Figure 4:
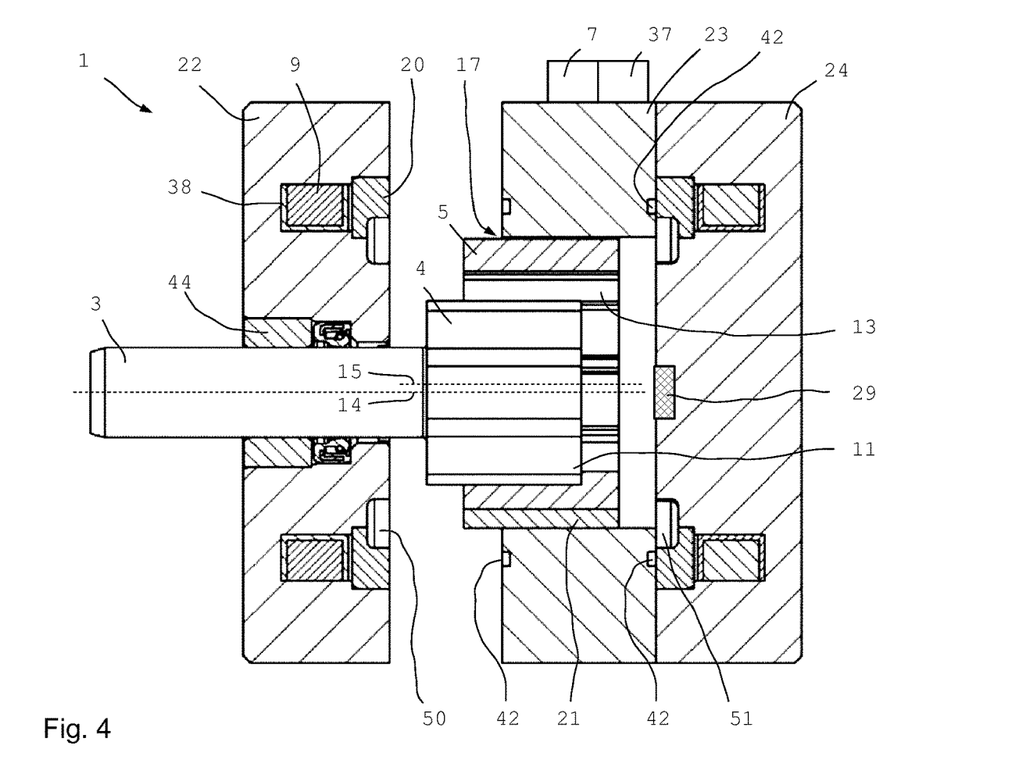
FIG. 4 an exploded view of a cross-section of the rotary damper from FIG. 3.

FIG. 4 shows an exploded depiction of the rotary damper 1 in cross-section, wherein the housing part on the left here with the first end region 22 and also the first displacer component 4 and the second displacer component 5 are each shown slightly axially offset, in order to allow a better understanding of the technical function.

The damper shaft 3 is here configured integrally with the first displacer component 4, which has an outer toothing 11 on its outer periphery which meshes with an inner toothing 13 inside the second displacer component 5. The second displacer component 5 is radially surrounded by a damper channel 17, through which the magnetorheological fluid—here conveyed in the interior of the second displacer component 5—can flow back to the axially other side.

On the outside of the housing 12, the control device 7 is shown here which can be supplied with the necessary current via an energy store 37 or accumulator or similar, even when an electrical power supply fails.

A compensation volume 29 is provided in order to provide compensation for a leakage (e.g. via the damper shaft 3) and/or volume at different temperatures. The compensation volume 29 may contain a compressible mass or a compressible gas bladder in order to provide a volume compensation for different temperatures.

The damper shaft 3 is mounted via a bearing 44. The rotary axis 14 of the first displacer component 4 corresponds to the rotary axis of the damper shaft 3. The rotary axis 15 of the second displacer component 5 is offset parallel thereto.

Figure 5:
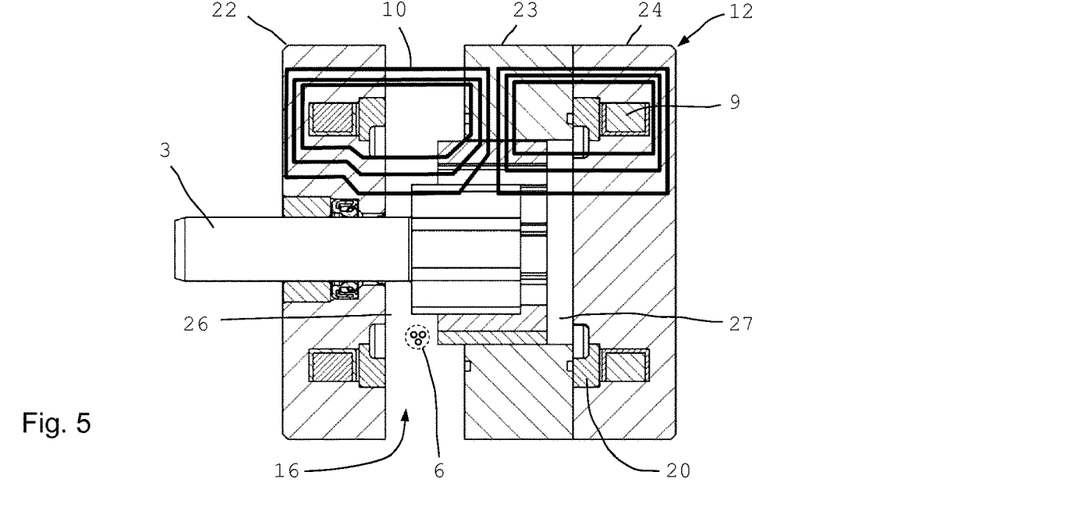

FIG. 5 shows a similar depiction to FIG. 4, wherein however some magnetic field lines of the magnetic field 10 have been drawn as examples. The magnetic field lines each run through an end region and the middle region 23 of the housing 12, and pass approximately radially through the damping gap 18 (see FIG. 6) between the housing 12 and the second displacer component 5, and then transfer from the second displacer component 5 into the first displacer component 4. From there, the magnetic field lines run through the axial gap 25 (see FIG. 6) between the first or second displacer component 4, 5 and the respective end region 22, 24, so that closed magnetic field lines result. Here, an electrical coil in each end region 22, 24, generates magnetic fields which seal both the radial gap between the displacer components and also the two end-side axial gaps 25.

Because an electrical coil 9 is provided in each end region of the housing 12, and because the electrical coils 9 extend over the periphery of the respective end region, practically every gap between the displacer components 4, 5, and between the displacer components 4, 5 and the housing 12, is exposed to the magnetic field 10 of the magnetic field source 8. Thus the magnetorheological particles of the magnetorheological fluid 6 present in the interior 16 of the rotary damper 1 or housing 12 interlink, wherein the strength of the interlinking depends on the strength of the acting magnetic field 10.

Due to the magnetically non-conductive rings 20 which overall have a relative permeability of less than ten, a magnetic short-circuit in the respective end regions 22, 24 is reliably prevented. It is also possible that one end region (or both) consists of two or more parts or portions. Here, the portion adjacent to the displacer components 4, 5 is preferably more magnetically conductive than the magnetically non-conductive ring. The adjacent portion (or entire end region) preferably has a relative permeability of more than ten, and in particular more than 100 and preferably more than 1000.

Figure 6:
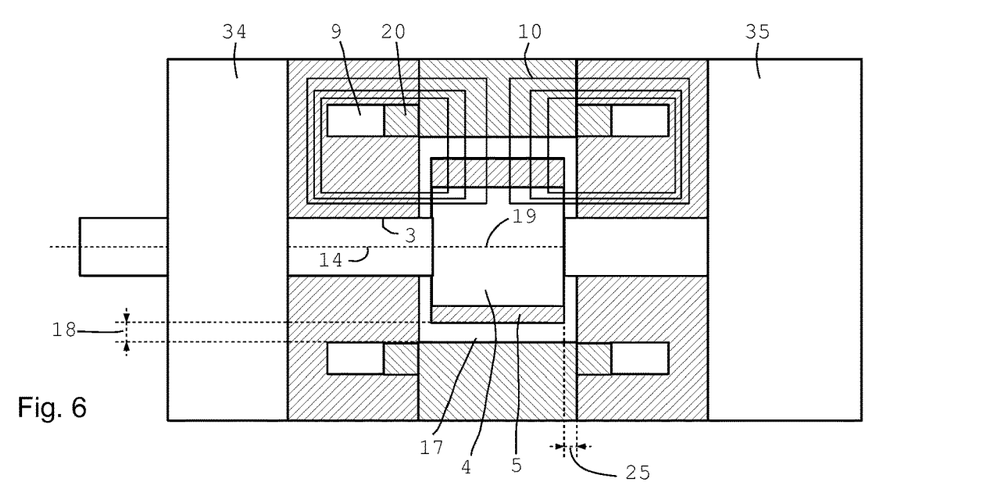
FIG. 6 a further rotary damper in a highly diagrammatic, sectional depiction.

FIG. 6 shows a slightly modified embodiment in diagrammatically sectional depiction, wherein the distances and gaps 18, 25 are here shown enlarged in order to make them more visible at the scale used. Here, the rotary damper 1 optionally comprises an electric motor 35 at the second end region 24. For this, it is possible that the damper shaft extends completely through the rotary damper 1, so that the electric motor 35 is coupled thereto. A preliminary gear mechanism 34 may be connected here on the side of the first end region 22.

The axial gap 25 and the radial gap 18 between the displacer components 4, 5 and the end regions 22, 24, or between the second component 5 and the housing 12 in the radial direction, are clearly visible. In reality, the radial gap 18 is approximately two to four times, and in particular around three times as large as the axial gap 25. In concrete embodiments, an axial gap 25 of around 0.03 mm, and a radial gap of around 0.3 mm, have proved favorable.

Figure 7:
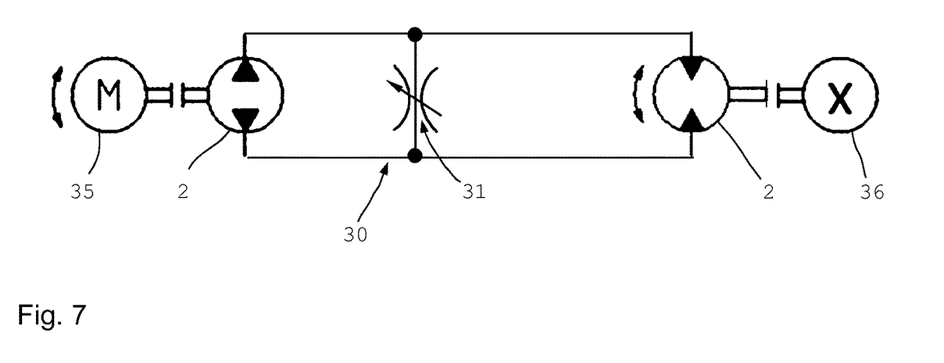
FIG. 7 a further exemplary embodiment of a rotary damper.

FIG. 7 finally shows an exemplary embodiment in highly diagrammatic depiction, in which an electric motor 35 and the actuator 36 may be provided. Here, the apparatus 100 comprises two displacer devices 2 and at least one external valve 30 with a valve channel 31 as a damping channel. In this embodiment, it is possible that the individual displacer devices 2 have no explicit damper channel, but that only the damper channel 31 on the external damper valve 30 is provided. The magnetic field of the magnetic field source 8 also acts there. In this embodiment, it is possible to rotate the actuator which is in particular configured as a rotation unit. The rotation direction of the electric motor 35 may be changed in order to set a left rotation or right rotation of the actuator. Thus a strap or cable of a sports machine may for example also be reeled in.

Another possible approach for configuring an MRF rotary damper 1 is based on the pump not only generating pressure directly, but also performing an electromagnetic resistance work by the rotational movement of the pump and magnetization of the gaps. The resistance work may be regulated via the current and allows the complete omission of an (external) valve unit, and the unit is constructed very compactly.

Figure 8:
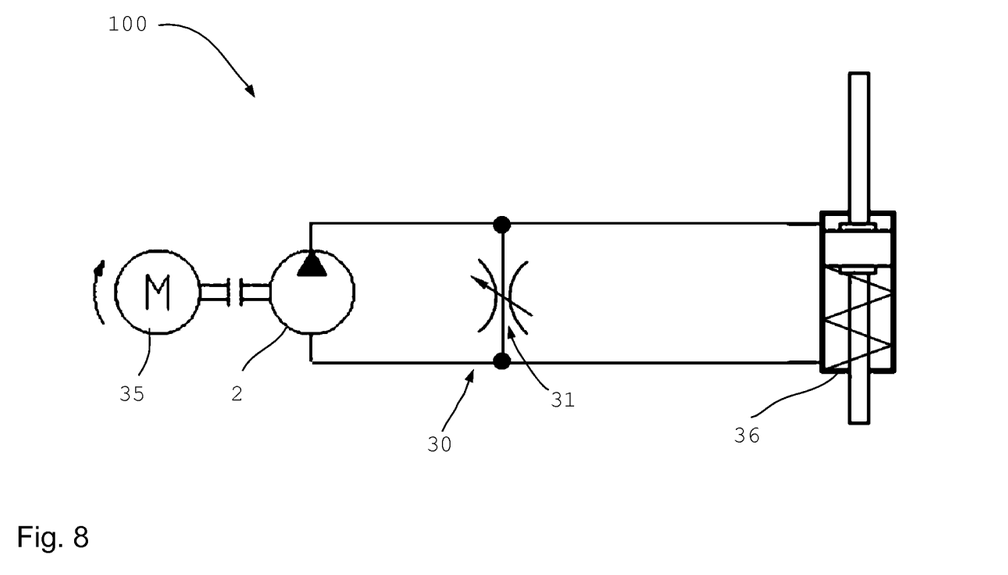
FIG. 8 a further exemplary embodiment of an active rotary damper.

FIG. 8 shows an embodiment of the apparatus 100 in which the electric motor 35 always runs in the same direction when switched on. Here, the control device controls the external damper valve 30 with the damping channel 31, and the motor 35 which operates the displacer device 2. Depending on the magnetic field acting on the damping channel, the actuator 36—which is here configured as a piston-cylinder unit—is extended against the force of the integrated spring. If the electric motor is stopped and the magnetic field of the damping valve 30 reduced, the actuator 36 is automatically returned by the force of the spring shown. The return movement may be controlled accordingly, or even prevented, either via the rotary damper 1 or via the displacer device 2.

Figure 9:
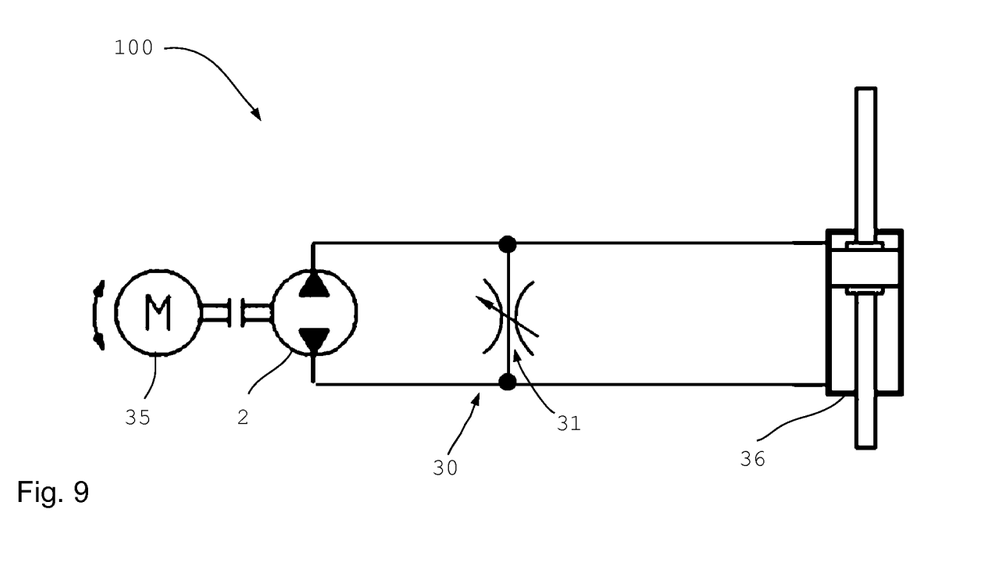
FIG. 9 a further exemplary embodiment of an active rotary damper.

FIG. 9 finally shows an embodiment in which the electrical motor 35 can be driven in both drive directions. Depending on the direction of rotation of the motor, the actuator 36—which is here again configured as a piston—cylinder unit—is extended or retracted. In order to achieve regulation of the actuator speed, the magnetorheological valve 30 can divert the volume flow from 0 to 100% via a bypass.

Figure 10:
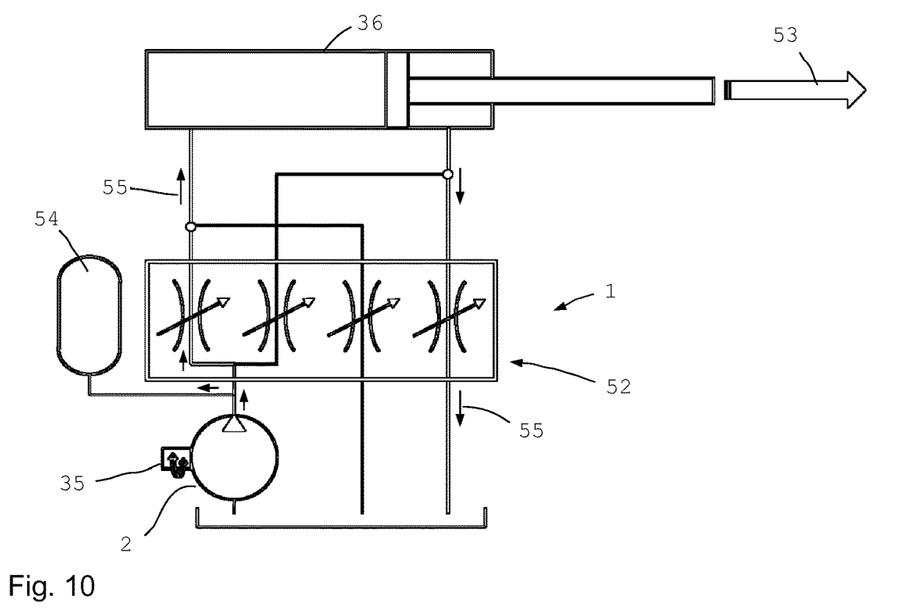
FIG. 10 an overview diagram of the use in an active hydraulic circuit.
Figure 11:
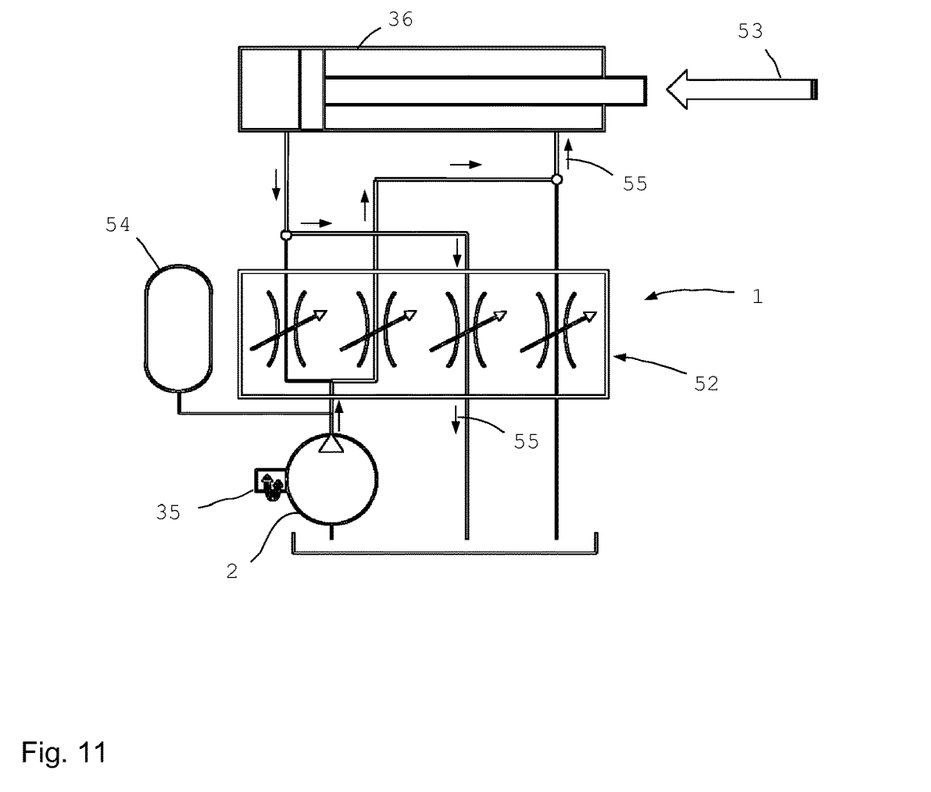
FIG. 11 the hydraulic circuit from FIG. 11 in another valve position.

FIG. 10 shows an overview diagram of the use of rotary dampers in an active hydraulic circuit in a first circuit position, and FIG. 11 in a second circuit position.

The advantages here lie in the possibility of real-time control of an actuator 36 such as e.g. a hydraulic cylinder. Four valve units 52 are used with assigned magnetic field sources. The stepless control of the valve units 52, from 0 to 100% in the millisecond range, allows a very high system dynamic. The working method of the individual MRF high-pressure valves 52 and their switch logic is similar to a bridge circuit in electronics. In FIG. 10, the middle two of the total of four valve units 52 here are blocked (magnetically). The outer two valve units 52 may be set flexibly. This gives a fluid flow of the MRF along the arrows 55, and the piston rod of the cylinder 36 extends in the direction of the arrow 53.

FIG. 11 shows another switch position of the valve units 52, in which the middle two valve units 52 can be set flexibly. The outer two valve units 52 are blocked here. Drive can take place in both directions via the rotary damper 1 serving as a motor 35. It is also possible that a pressure store 54 acts in one direction, and ensures an automatic retraction or extension of the cylinder 36.

In all embodiments, it is possible to implement an energy recovery. Thus for example, on use of a prosthesis, the torque introduced from the outside, such as for example from sitting down, is converted via the rotary damper 1, which in this case serves as a type of pump, into "hydraulic energy"; this can then be converted by the displacer device into electrical energy. For this, an electric drive motor is used as a generator. It is also possible to store the energy in a pressure store. A considerable advantage over a purely electrical solution, in which an electric motor and the gear mechanism are used, is the sound level, since hydraulics generally work more quietly. Electric motors with connected gear mechanisms however are usually louder. In the field of prostheses in particular, a very low sound level is of considerable advantage (e.g. when moving during a concert). In addition, hydraulics take up very little space and are fast.

In the variant shown on the right in FIG. 1, the different actuators can be interlinked intelligently so that they provide mutual support or mutual assistance. Thus the brake pressure in one rotary damper 1 may be used to actuate another unit. In this way, a harmonious movement sequence can be achieved. The knee can be "interlinked" with the hip or the foot. It is also possible to link together more or all joints when used for example as an exoskeleton or on a robot. Then, in some cases, the fingers or toes may be included. Also, with the additional use of electric motors, the system can be configured so as to be active.

The invention may serve also to limit the retention force of a safety belt or a safety steering column in a personal transport means, and be directed at this. For optimal adaptation and set-up of the restraint system, also in connection e.g. with an airbag, several force limiter stages ("soft" to "hard") may be set. It is possible to use the maximum forward movement travel of the occupants available in the passenger compartment. A belt force limiter for the passenger may be designed "softer", since due to the absence of a steering wheel, usually more internal forward movement travel is available. Here, forces in the range from around 2000 N to around 6000 N are required on the belt, which results in high moments (up to 100 Nm) and high rotation speeds (up to 6000 rpm) on the belt winder. MRF couplings according to the prior art cannot achieve these rotation speeds, since the MRF centrifuges out and could enter the constituent parts. A gear mechanism is however usually too large and too costly. It is also possible, in addition, to use a belt tensioner so that a vehicle occupant can be braked as early as possible. The belt can be retracted by up to 15 cm within around 10 to 15 ms. This is useful in particular if thick clothing prevents a close application of the belt on the body. If e.g. a medium such as for example paper, thread or similar is to be wound onto a roller with constant tension, this can be achieved with the invention by varying the drive or braking moment according to the diameter change of the winding roller.

Use is also possible on fitness, rehabilitation or sports machines such as e.g. weightlifters, rowing machines, training cycles, and also on the treadmill and similar. Further areas of use are adaptive brakes in fitness machines (e.g. rotation: training cycles, treadmill, levers in weightlifting, rowing machines; linear movement into rotation: lifting weights etc.). In fitness machines, a travel- or angle-dependent counter-force/-moment is possible. In modern fitness machines (primarily with weights), the counter-force (counter-moment) however remains constant over the travel distance/angle (gravity). It is now possible to adapt the force according to the optimal effect for the muscle or person. This may also be dependent on the positions of the joints. It may also be advantageous if the counter-force rises or falls slowly so that no load peaks etc. occur.

Advantageously, linking with a Smartphone is possible for recording and setting. Then the ideal setting is always programmed in the Smartphone. As soon as the user enters the fitness center or rehabilitation, this setting is transferred to the fitness machine. Analysis is also possible.

Use is also possible in prosthetics, or on prostheses e.g. on a knee prosthesis, a hip prosthesis, a foot prosthesis, an arm prosthesis etc. This may take place similarly to the current linear actuators. Around 60 to 150 Nm are required in the knee.

A movement translation from rotational to linear or vice versa may take place, or via levers into other movement forms. Use is also possible on mine protection seats. The invention may also be used for suspension damping of motor vehicles.

It may also be used on a stabilizer, wherein the rotary damper is arranged between two components of a stabilizer which can be adjusted and in particular rotated relative to each other. Here, one component is coupled to one side and the other component to the other side, so that a movement/rotation of the stabilizer components relative to each other can be damped, fully decoupled or adjusted in controlled fashion via the rotary damper 1. In this way, an active stabilizer can be provided which may be set for different driving conditions (e.g. a wheel travels over a pothole=decouple; cornering=roll stabilization by targeted damping or interconnection of the two stabilizer halves).

Use is also possible on a rear wheel swing arm or a front wheel swing arm of a cycle or motorcycle.

LIST OF REFERENCE SIGNS

1 Rotary damper
2 Displacer device
3 Damper shaft
4 Displacer component
5 Displacer component
6 Magnetorheological fluid
7 Control device
8 Magnetic field source
9 Electrical coil
10 Magnetic field
11 External toothing of 4
12 Housing of 2
13 Internal toothing of 5
14 Rotary axis of 4
15 Rotary axis of 5
16 Interior of 2
17 Damping channel
18 Damping gap (radial)
19 Axis of 9
20 Ring in 12
21 Guide unit
22 First end region
23 Middle region
24 Second end region
25 Axial gap
26 Inlet, suction side
26a Suction nipple
27 Outlet, pressure side
27a Pressure nipple
28 Seal on 3
29 Compensation volume
30 Damping valve
31 Valve channel
32 Angle sensor
33 Load sensor
34 Preliminary gear mechanism
35 Electric motor
36 Actuator
37 Energy store
38 Coil holder
39 Permanent magnet
40 Sensor device
41 Distance
42 Seal of 23
43 Intermediate space
44 Bearing
50 Collection groove
51 Collection groove
52 Valve unit
53 Movement direction
54 Pressure store
55 Arrow direction
100 Apparatus
102 Cable reel
105 Prosthesis
106 Line
110 Device
111 Strap
120 Object

The invention claimed is:

1. A rotary damper, comprising:
a housing;
a displacer device with a plurality of displacer components disposed in said housing;
magnetorheological fluid being a working fluid contained in said displacer device;
a magnetic field source for generating a magnetic field, said magnetic field source including at least two coils disposed to generate a magnetic field to act on said magnetorheological fluid;
said housing and said displacer device being configured to form a first end-side axial gap and a second end-side axial gap therebetween;
wherein a substantial portion of the magnetic field of said two coils of said magnetic field source passes through said first end-side axial gap and said second axial gap respectively, between said housing and said displacer components to thereby cause said magnetorheological fluid to set a damping of a rotary movement of said displacer device and to seal said first end-side axial gap and said second end-side axial gap against leakage of said magnetorheological fluid;
said displacer components including a first displacer component fixedly connected to a damper shaft, and a second displacer component received rotatably in said housing of said displacer device, and wherein said first displacer component is in engagement with said second displacer component and arranged eccentrically relative to said second displacer component.

2. The rotary damper according to claim 1, wherein said displacer device has a damper shaft and said first displacer component and said second displacer component are rotatable relative to each other, and wherein a rotary movement of the damper shaft is damped by subjecting the magnetorheological fluid to the magnetic field.

3. The rotary damper according to claim 1, wherein said first end-side axial gap and said second end-side axial gap are formed between said housing and said displacer device on opposite axial ends of said displacer components, and wherein a substantial portion of each of the magnetic fields of said two coils of said magnetic field source passes through one of the end-side axial gaps between said housing and said displacer components and causes a seal of said end-side axial gaps.

4. The rotary damper according to claim 1, wherein said two coils of said magnetic field source are configured to extend the magnetic field transversely to said axial gap.

5. The rotary damper according to claim 1, further comprising at least one electric motor to be coupled to a damper shaft of said displacer device.

6. The rotary damper according to claim 1, further comprising at least one external actuator fluidically connected with said displacer device, said at least one actuator being a piston-cylinder unit.

7. The rotary damper according to claim 1, further comprising at least one sensor device having at least one position and/or distance sensor for detecting a position and/or a distance from surrounding objects, and wherein said control device is configured to control the rotary damper in dependence on sensor data of said sensor device.

8. The rotary damper according to claim 1, wherein a pressure is set in said displacer device based on a rotary movement of said displacer components causing a geometric enlargement or reduction of a displacer chamber formed therein.

9. The rotary damper according to claim 1, wherein the rotary damper is specifically configured for, and integrated into, an apparatus or machine selected from the group consisting of a winder, a coil machine, a weaving machine, a prosthesis, a stabilizer of a motor vehicle, a device for supporting sports, rehabilitation or fitness exercises, and two units that are movable relative to each other.

10. A rotary damper, comprising:
a housing having a first end region, a second end region, and a middle region between said first and second end regions;
a displacer device with a plurality of displacer components disposed in said housing;
magnetorheological fluid being a working fluid contained in said displacer device;
a magnetic field source for generating a magnetic field, said magnetic field source including at least two coils disposed to generate a magnetic field to act on said magnetorheological fluid;
said housing and said displacer device being configured to form a first end-side axial gap and a second end-side axial gap therebetween;
wherein a substantial portion of the magnetic field of said two coils of said magnetic field source passes through said first end-side axial gap and said second axial gap respectively, between said housing and said displacer components to thereby cause said magnetorheological fluid to set a damping of a rotary movement of said displacer device and to seal said first end-side axial gap and said second end-side axial gap against leakage of said magnetorheological fluid;
the at least two electrical coils are respectively received in one of a first and a second end region of said housing, and wherein an axis of each of said at least two electrical coils is oriented substantially parallel to a damper shaft of said displacer device.

11. The rotary damper according to claim 10, wherein said displacer components include a first displacer component fixedly connected to a damper shaft, and a second displacer component received rotatably in said housing of said displacer device, wherein said first displacer component is in engagement with said second displacer component and arranged eccentrically relative to said second displacer component.

12. The rotary damper according to claim 11, wherein said first displacer component has an external toothing, and wherein said second displacer component has an internal toothing, and wherein said second displacer component is received rotatably in said housing.

13. The rotary damper according to claim 12, wherein said displacer device is formed with at least one damping channel which can be exposed to the magnetic field of said magnetic field source.

14. The rotary damper according to claim 13, wherein said at least one damping channel comprises at least one damping gap radially between said second displacer component and said housing.

15. The rotary damper according to claim 11, wherein said second displacer component is guided rotatably in said housing via a plurality of guide units, in order to guarantee a defined damping gap between said second displacer component and said housing.

16. The rotary damper according to claim 10, wherein said housing consists primarily or exclusively of a magnetically conductive material with a relative permeability of more than 100.

17. The rotary damper according to claim 16, which comprises a ring made of a material with a relative permeability of less than 10 arranged axially adjacent said at least one electrical coil in said housing, wherein said ring is arranged axially between said electrical coil and said displacer components.

18. A rotary damper, comprising:
a housing;
a displacer device with a plurality of displacer components disposed in said housing;
magnetorheological fluid being a working fluid contained in said displacer device;
a magnetic field source for generating a magnetic field, said magnetic field source including at least two coils disposed to generate a magnetic field to act on said magnetorheological fluid;
said housing and said displacer device being configured to form a first end-side axial gap and a second end-side axial gap therebetween;
wherein a substantial portion of the magnetic field of said two coils of said magnetic field source passes through said first end-side axial gap and said second axial gap respectively, between said housing and said displacer components to thereby cause said magnetorheological fluid to set a damping of a rotary movement of said displacer device and to seal said first end-side axial gap and said second end-side axial gap against leakage of said magnetorheological fluid;
wherein said displacer device has an inlet and an outlet for said magnetorheological fluid, and wherein said magnetorheological fluid is conveyed from said inlet to said outlet of said displacer device by a rotational movement of said mutually engaging displacer components.

19. A rotary damper, comprising:
a housing;
a magnetic field source for generating a magnetic field;
a displacer device with a plurality of displacer components disposed in said housing;
magnetorheological fluid being a working fluid contained in said displacer device;
said housing and said displacer device being configured to form an end-side axial gap therebetween;
wherein a substantial portion of the magnetic field of said magnetic field source passes through said axial gap between said housing and said displacer components to thereby cause said magnetorheological fluid to operate said displacer device and to set a damping of a rotary movement thereof;
said displacer device having an inlet and an outlet for said magnetorheological fluid, and wherein said magnetorheological fluid is conveyed from said inlet to said outlet of said displacer device by a rotational movement of said mutually engaging displacer components, and said inlet is disposed to be subject to a weaker magnetic field that said outlet.

* * * * *